(12) United States Patent
Lapadula et al.

(10) Patent No.: US 12,102,987 B2
(45) Date of Patent: Oct. 1, 2024

(54) CATALYTIC MATERIAL WITH SULFUR-TOLERANT SUPPORT

(71) Applicant: BASF Corporation, Florham Park, NJ (US)

(72) Inventors: Gerard D. Lapadula, New York, NY (US); Tiep M. Pham, Old Bridge, NJ (US); Michael Durilla, Howell, NJ (US); Pascaline Harrison Tran, Holmdel, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 18/385,753

(22) Filed: Oct. 31, 2023

(65) Prior Publication Data

US 2024/0058792 A1 Feb. 22, 2024

Related U.S. Application Data

(60) Continuation of application No. 17/459,984, filed on Aug. 27, 2021, now Pat. No. 11,839,868, which is a
(Continued)

(51) Int. Cl.
*B01J 21/04* (2006.01)
*B01D 53/94* (2006.01)
(Continued)

(52) U.S. Cl.
CPC ............ *B01J 23/63* (2013.01); *B01D 53/944* (2013.01); *B01J 21/04* (2013.01); *B01J 21/066* (2013.01); *B01J 21/08* (2013.01); *B01J 23/002* (2013.01); *B01J 23/42* (2013.01); *B01J 23/44* (2013.01); *B01J 35/30* (2024.01); *B01J 35/393* (2024.01); *B01J 37/0228* (2013.01); *B01J 37/0236* (2013.01); *B01J 37/0242* (2013.01);
(Continued)

(58) Field of Classification Search
CPC . B01J 21/04; B01J 21/066; B01J 21/08; B01J 23/002; B01J 23/42; B01J 23/44; B01J 23/63; B01J 35/30; B01J 35/393; B01J 37/0228; B01J 37/0236; B01J 37/0242; B01J 37/0248; B01J 37/08; B01D 53/944; F01N 3/2803; F01N 3/2825; C10K 3/04
USPC .................. 502/262, 304, 332–334, 339, 349
See application file for complete search history.

(56) References Cited

U.S. PATENT DOCUMENTS 4,316,822 A   2/1982  Fujitana et al.
4,963,521 A   10/1990 Engler et al.
(Continued)

FOREIGN PATENT DOCUMENTS

WO    WO1999047625    9/1999

OTHER PUBLICATIONS

Notification of Transmittal of the International Search Report and the Written Opinion of the International Searching Authority, or the Declaration for International Application No. PCT/EP2016/052832 mailed Dec. 8, 2016, 14 pgs.
(Continued)

*Primary Examiner* — Cam N. Nguyen
(74) *Attorney, Agent, or Firm* — Lowenstein Sandler LLP

(57) ABSTRACT

Disclosed in certain embodiments is a catalytic material comprising: an active precious metal component comprising platinum; a sulfur-tolerant support material comprising silica on zirconia; and a substrate having the catalytic material coated thereon.

20 Claims, 5 Drawing Sheets

Related U.S. Application Data division of application No. 15/756,432, filed as application No. PCT/US2016/052832 on Sep. 21, 2016, now Pat. No. 11,130,116.

(60) Provisional application No. 62/221,797, filed on Sep. 22, 2015.

(51) Int. Cl.

| | | |
|---|---|---|
| *B01J 21/06* | (2006.01) | |
| *B01J 21/08* | (2006.01) | |
| *B01J 23/00* | (2006.01) | |
| *B01J 23/42* | (2006.01) | |
| *B01J 23/44* | (2006.01) | |
| *B01J 23/63* | (2006.01) | |
| *B01J 35/30* | (2024.01) | |
| *B01J 35/39* | (2024.01) | |
| *B01J 37/02* | (2006.01) | |
| *B01J 37/08* | (2006.01) | |
| *C10K 3/04* | (2006.01) | |
| *F01N 3/28* | (2006.01) | |

(52) U.S. Cl.
CPC ........... *B01J 37/0248* (2013.01); *B01J 37/08* (2013.01); *C10K 3/04* (2013.01); *F01N 3/2803* (2013.01); *F01N 3/2825* (2013.01); *B01D 2255/1021* (2013.01); *B01D 2255/1023* (2013.01); *B01D 2255/2065* (2013.01); *B01D 2255/20715* (2013.01); *B01D 2255/2092* (2013.01); *B01D 2255/30* (2013.01); *B01J 2523/00* (2013.01); *F01N 2370/02* (2013.01); *F01N 2510/067* (2013.01)

(56) References Cited

U.S. PATENT DOCUMENTS

| | | |
|---|---|---|
| 5,061,464 A | 10/1991 | Cordonna, Jr. et al. |
| 5,145,825 A | 9/1992 | Deeba et al. |
| 6,255,249 B1 | 7/2001 | Voss et al. |
| 6,913,739 B2 | 7/2005 | Shore et al. |
| 7,576,031 B2 | 8/2009 | Beutel et al. |
| 7,875,573 B2 | 1/2011 | Beutel et al. |
| 7,976,784 B2 | 7/2011 | Liu et al. |
| 8,105,559 B2 | 1/2012 | Melville et al. |
| 8,667,785 B2 | 3/2014 | Blakeman et al. |
| 9,034,269 B2 | 5/2015 | Hilgendorff et al. |
| 9,034,287 B2 | 5/2015 | Gerlach et al. |
| 9,044,734 B2 | 6/2015 | Grubert et al. |
| 9,138,725 B2 | 9/2015 | Hoke et al. |
| 9,399,208 B2 | 7/2016 | Yang et al. |
| 9,528,408 B2 | 12/2016 | Oger et al. |
| 10,857,521 B2 | 12/2020 | Sung et al. |
| 2002/0131914 A1 | 9/2002 | Sung |
| 2002/0131915 A1 | 9/2002 | Shore et al. |
| 2005/0025701 A1 | 2/2005 | Bhat et al. |
| 2005/0164879 A1 | 7/2005 | Chen |
| 2008/0045405 A1 | 2/2008 | Beutel et al. |
| 2009/0269263 A1 | 10/2009 | Rohart et al. |
| 2010/0215557 A1 | 8/2010 | Liu et al. |
| 2012/0122670 A1 | 5/2012 | Polli et al. |
| 2012/0328500 A1 | 12/2012 | Larcher et al. |
| 2014/0044628 A1 | 2/2014 | Ifrah |
| 2014/0271427 A1 | 9/2014 | Hoke et al. |
| 2014/0322119 A1 | 10/2014 | Chen et al. |
| 2015/0098879 A1 | 4/2015 | Oger et al. |
| 2016/0304795 A1 | 10/2016 | Lanci et al. |
| 2019/0144774 A1 | 5/2019 | Lanci et al. |

OTHER PUBLICATIONS

Extended European Search Report for Application No. 16849483.9 mailed May 6, 2019, 9 pgs.

CATALYTIC MATERIAL WITH SULFUR-TOLERANT SUPPORT

CROSS REFERENCE TO RELATED APPLICATIONS

This application is a continuation of U.S. Non-Provisional patent application Ser. No. 17/459,984, filed on Aug. 27, 2021, which is a divisional application of U.S. Non-Provisional patent application Ser. No. 15/756,432, filed on Feb. 28, 2018, which is a national phase filing of International Patent Application No. PCT/US2016/052832, filed on Sep. 21, 2016, which claims the benefit of priority of U.S. Provisional Patent Application No. 62/221,797, filed Sep. 22, 2015. The contents of these applications are hereby incorporated by reference herein in their entireties.

FIELD OF THE INVENTION

The present invention relates to a sulfur tolerant oxidation catalytic system, methods of manufacturing, and methods of use for such catalytic systems in power generation, mobile, or stationary source exhaust applications containing CO, HCs, VOCs, ozone, NOx, or other compounds.

BACKGROUND OF THE INVENTION

Sulfur compounds in natural gas may have a deleterious effect on oxidation catalysts used to treat exhaust gas from power generation turbines. The levels and types of sulfur compounds found in natural gas may vary due to source region, mercaptans used for odorants, and increased use of hydraulic fracturing. In particular, alumina based catalysts have been known to quickly deactivate in high sulfur exhaust gases due to aluminum sulfate formation and subsequent loss of catalyst carrier surface area.

The need for a sulfur tolerant catalyst that can maintain its activity in the long term still remains due to market pressures for increased cost savings in the power generation industry and the unexpected high sulfur levels in exhaust streams. Such a sulfur tolerant catalyst will provide the power generation operator with peace of mind, more income while operating at high efficiency conditions, and less downtime due to catalyst washing and replacement.

Efforts to create sulfur tolerant oxidation catalysts using a variety of methods have been previously described, including adding a bismuth compound to the catalytic system to inhibit the production of sulfur trioxide compounds (which are known for their catalyst poisoning propensity) and applying multiple washcoat layers of varying platinum and palladium ratios to boost sulfur tolerance. Nevertheless, there continues to be a need for methods and compositions for a sulfur-tolerant oxidation catalyst that can maintain long term efficacy and performance despite unexpected high sulfur level conditions.

SUMMARY

It is an object of certain embodiments of the disclosure to provide a catalytic system that is sulfur tolerant.

It is an object of certain embodiments of the disclosure to provide a method for preparing a sulfur tolerant catalytic system.

It is an object of certain embodiments of the disclosure to provide a method of controlling carbon monoxide levels in an exhaust gas stream containing high sulfur levels.

It is an object of certain embodiments of the disclosure to provide a method of controlling carbon monoxide levels in an exhaust gas stream devoid of sulfur.

The above objects and others are met by the present disclosure, which in certain embodiments is directed to a catalytic system comprising a catalytic material and a substrate, wherein the catalytic material is coated on the substrate. In certain embodiments, the catalytic material comprises an active precious metal component and a sulfur-tolerant support material. In certain embodiments, the active precious metal component comprises platinum, palladium, or mixtures thereof and the sulfur-tolerant support material comprises a mixture of silica and zirconia.

In certain embodiments, the disclosure is directed to a sulfur-tolerant catalytic system comprising a catalytic material, comprising an active precious metal component, comprising platinum, palladium, or a mixture thereof, wherein platinum may be present in an amount ranging from 0.4 wt % to 5.0 wt % based of a total weight of the catalytic material and the palladium may be present in an amount up to 5.0 wt % based of a total weight of the catalytic material, and a sulfur-tolerant support material may be present in an amount ranging from 90 wt % to 98 wt % based of a total weight of the catalytic material, and a substrate, wherein the catalytic material may be coated on the substrate.

In certain embodiments, the sulfur-tolerant catalytic system may further comprise bulk ceria, which may be present in an amount ranging from 0.5 wt % to 10 wt % based on a total weight of the catalytic material. The catalytic system may further comprise alumina, which may be present in an amount of up to 10 wt % based on a total weight of the catalytic material.

In certain embodiments, the substrate of the sulfur-tolerant catalytic system may comprise a ceramic material or a metal foil. In certain embodiments, the catalytic material may be washcoated on the substrate.

In certain embodiments, the sulfur-tolerant catalytic system comprises particles of catalytic material, comprising an active precious metal component and a sulfur-tolerant support, and a substrate, wherein the particles of catalytic material are washcoated on the substrate and the 90% cumulative undersize particles of catalytic material may be, for example, from about 6 micrometers to about 14 micrometers, or about 10 micrometers.

In certain embodiments, the disclosure is directed to a method of preparing a sulfur-tolerant catalytic system that may obtain a carbon monoxide conversion greater than 80% after continuous long term operation under high sulfur level conditions.

In certain embodiments, the method of preparing a sulfur-tolerant catalytic system comprises: impregnating an active precious metal solution, comprising platinum, palladium, or a mixture thereof, onto a sulfur tolerant support material, comprising a mixture of silicon and zirconium oxides, to form a slurry; coating a substrate, comprising a ceramic material or a metal foil, with the slurry; drying the coated substrate; and calcining the coated substrate, to prepare a sulfur-tolerant catalytic system that may obtain a carbon monoxide conversion greater than 80% after continuous long term operation under high sulfur level conditions.

In certain embodiments, the method of preparing a sulfur tolerant catalytic system comprises: coating a substrate, comprising a ceramic material or a metal foil, with a sulfur-tolerant support material, comprising a mixture of silicon and zirconium oxides; impregnating an active precious metal component, comprising platinum, palladium, or a mixture thereof, onto the coated substrate; drying the coated substrate; and calcining the coated substrate, to prepare a sulfur-tolerant catalytic system that may obtain a carbon monoxide conversion greater than 80% after continuous long term operation under high sulfur level conditions.

In certain embodiments, the method of preparing a sulfur-tolerant catalytic system comprises: impregnating an active precious metal component, comprising platinum, palladium, or a mixture thereof, onto a sulfur-tolerant support material, comprising a mixture of silicon and zirconium oxides, to form a slurry; coating a substrate, comprising a ceramic material or a metal foil, with the slurry; drying the coated substrate; repeating the coating and the drying as necessary; and calcining the coated substrate, to prepare a sulfur-tolerant catalytic system that may obtain a carbon monoxide conversion greater than 80% after continuous long term operation under high sulfur level conditions.

In certain embodiments the coating may be applied using a washcoating method.

In certain embodiments, the disclosure is directed to a method of preparing a sulfur tolerant catalytic system, comprising a catalytic material, comprising active precious metal component present in an amount ranging from about 0.4 wt % to about 10 wt % based on total catalytic material composition, a sulfur-tolerant support present in an amount ranging from about 90 wt % to about 98 wt % based on total catalytic material composition, a substrate, and bulk ceria present in an amount ranging from about 0.5 wt % to about 10 wt % based on total catalytic material composition. In certain embodiments, the sulfur-tolerant catalytic system may have aluminum present in an amount of up to about 10 wt % based on total catalytic material composition.

In certain embodiments, the method of preparing a sulfur-tolerant catalytic system comprises a catalytic material in a form of particles comprising 90% cumulative undersize particle size from about 6 micrometers to about 14 micrometers, or about 10 micrometers.

In certain embodiments, the disclosure is directed to a method for controlling carbon monoxide levels in an exhaust gas stream containing high sulfur levels comprising: providing a sulfur-tolerant catalytic system according to an embodiment of the disclosure; placing the sulfur-tolerant catalytic system in a stream containing carbon monoxide and high sulfur levels; and obtaining a carbon monoxide conversion greater than 80% after continuous long term operation under high sulfur level conditions. The substrate may comprise a ceramic or a metal foil. In certain embodiments, the disclosure is directed to a method for controlling carbon monoxide levels in a stream devoid of sulfur.

In certain embodiments, the disclosure is directed to a method of oxidizing carbon monoxide and/or controlling carbon monoxide levels in a gas stream, the method comprising: providing a catalyst system comprising a catalytic material, comprising an active precious metal component present in an amount ranging from 0.4 wt % to 10 wt % based on total catalytic material composition, a sulfur-tolerant support present in an amount ranging from 90 wt % to 98 wt % based on total catalytic material composition, a substrate, and bulk ceria present in an amount ranging from 0.5 wt % to 10 wt % based on total catalytic material composition. In certain embodiments, the catalytic system may comprise aluminum present in an amount of up to 10 wt % based on total catalytic material composition. In certain embodiments, the aluminum has unique properties, such as particle size and morphology, adapted to provide optimal binding between catalytic material and the substrate. The aluminum may be present in an amount sufficient to bind the catalytic material to various substrates (e.g. metallic substrate).

In certain embodiments, the method for controlling carbon monoxide levels in a stream comprises a sulfur tolerant catalytic system, comprising catalytic material in the form of particles having a 90% cumulative undersize particle size in the range of about 6 micrometers to about 14 micrometers, or about 10 micrometers.

The term "sulfur-tolerant" means that the physical and chemical characteristics and/or performance in a stream containing high sulfur levels remain unchanged or substantially unchanged when compared to the physical and chemical characteristics and/or performance in a stream containing little or substantially no sulfur.

The term "high sulfur levels" refers to a stream having sulfur levels in the range of about 0.1 ppm to about 500 ppm, or from about 50 ppm to about 500 ppm.

The term "long term operation" refers to continuous operation for a period longer than about 1500 hours, or longer than 3300 hours, or about 3300 hours, or from 1500 hours to 3300 hours.

The term "90% cumulative undersize particle size" refers to the relative amount of particles having a size at or below the particular size listed. For example, 90% cumulative undersize particle size in the range of about 6 micrometers to about 14 micrometers, means that 90% of the particles have a particle size ranging from about 6 micrometers to about 14 micrometers or below.

The term "catalytic material" encompasses active precious metals and the support. This term refers to elements used to promote a desired chemical reaction.

The term "catalytic system" encompasses the catalytic material and the substrate.

BRIEF DESCRIPTION OF THE DRAWINGS

The above and other features of the present disclosure, their nature, and various advantages will become more apparent upon consideration of the following detailed description, taken in conjunction with the accompanying drawings, in which.

DETAILED DESCRIPTION

Figure 1:
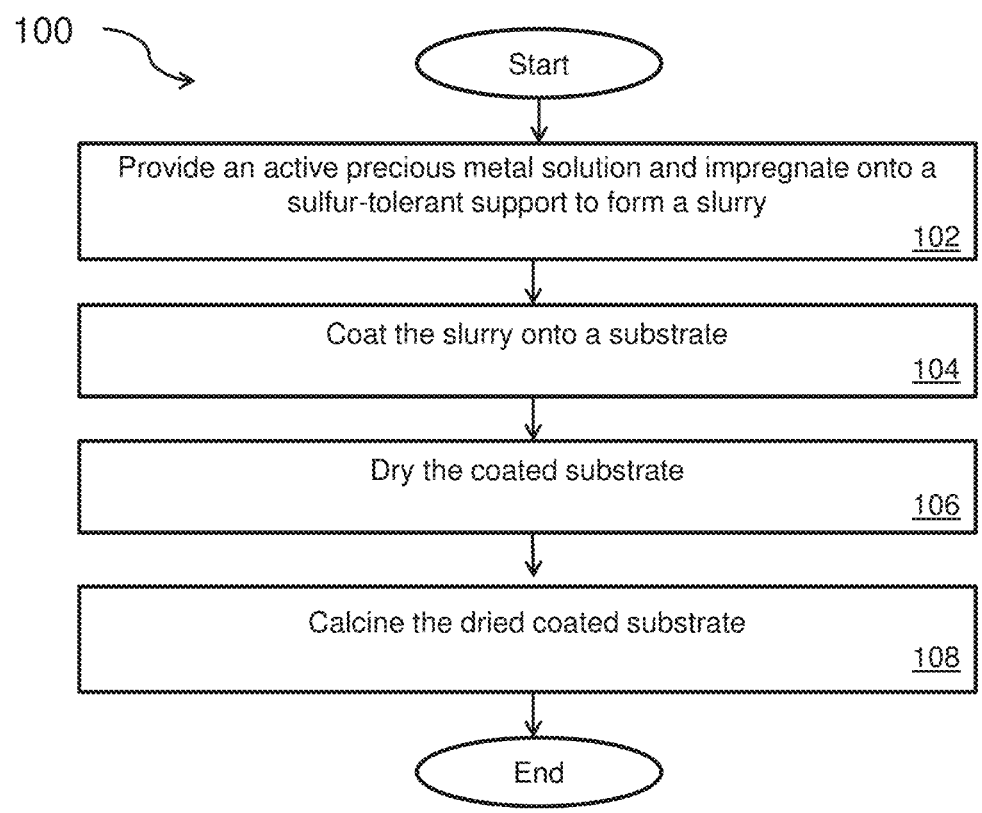
FIG. 1 is a flow chart illustrating a method for preparing a sulfur-tolerant catalytic system according to an embodiment of the disclosure.

The present disclosure is directed to a sulfur-tolerant catalytic system, methods of its preparation, and methods of its use in streams containing high sulfur levels. In one embodiment, the disclosure is directed to a treatment of an exhaust stream of a power generation turbine to convert pollutants such as carbon monoxide (CO), volatile organic compounds (e.g., aromatics, aldehydes, carboxylic acids, etc.), and $NO_x$ abatements into less harmful compounds such as oxygen, carbon dioxide and water vapor. Catalytic systems and methods of the present invention are suitable for treatment of various streams with high sulfur levels, for instance, volatile organic compound streams from chemical plants.

In one aspect of the disclosure, the sulfur-tolerant catalytic system provides an acceptable catalytic activity that is maintained over extended long term operations at high sulfur levels.

In certain embodiments, the disclosure is directed to a catalytic system comprising a catalytic material and a substrate, wherein the catalytic material is coated on the substrate. The catalytic material comprising an active precious metal component and a sulfur-tolerant support material. The active precious metal component comprising platinum, palladium, or mixtures thereof, and the sulfur-tolerant support comprising a mixture of silica and zirconia.

The sulfur-tolerant catalytic system disclosed herein may treat one or more pollutants, such as ozone, hydrocarbons, volatile organic compounds (e.g., aromatics, aldehydes, carboxylic acids, etc.), carbon dioxide, carbon monoxide, nitrous oxides (e.g., nitric oxide and nitrogen dioxide), or other pollutants. For example, the sulfur-tolerant catalytic system may convert ozone to oxygen; carbon dioxide to water; carbon monoxide to carbon dioxide; or nitrous oxides to nitrogen or nitrate.

The active precious metal of the sulfur-tolerant catalytic system disclosed herein may be, e.g., platinum, palladium, rhodium, ruthenium, gold, silver, other precious metals, compounds containing the same and combinations thereof.

In one embodiment, the active precious metal is a combination of platinum and palladium which may be derived from various precursory salt solutions.

The support material may be a high surface area support material. In certain embodiments, the support material has a surface area of at least about 100 $m^2/g$; at least about 150 $m^2/g$; at least about 200 $m^2/g$; from about 150 $m^2/g$ to about 275 $m^2/g$ or from about 200 $m^2/g$ to about 250 $m^2/g$.

The surface area of the material may be determined by the BET (Brunauer-Emmett-Teller) method according to DIN ISO 9277:2003-05. The specific surface area is determined by a multipoint BET measurement in the relative pressure range from 0.05-0.3 $p/p_0$.

The material utilized as the sulfur-tolerant support material can be a refractory oxide or any other suitable material. For example, the support material may comprise, e.g., ceria, lanthana, alumina, titania, silica, zirconia, carbons, metal organic framework, clay, zeolites, other refractory oxides, other suitable materials, and combinations thereof.

In one embodiment, the sulfur-tolerant support material is selected from a group comprising silica, zirconia, and combinations thereof. In one embodiment, the support material is a combination of silica and zirconia which may be derived from silicon oxide and zirconium oxide co-precipitated or comingled mixture.

The silicon oxide to zirconium oxide=weight ratio (w/w) may range from about 1:4 to about 1:98.

In another embodiment, the active precious metal component of the catalytic system may be in an amount, e.g., ranging from about 0.1 wt % to about 2.0 wt %, about 0.1 wt % to about 1.2 wt %, or about 0.1 wt % to about 0.6 wt % based on total weight of the catalytic system, or ranging from about 0.4 wt % to about 10 wt %, about 0.4 wt % to about 3.0 wt %, or about 0.4 wt % to about 1.5 wt % based on total weight of the catalytic material. In certain embodiments, platinum may be present from about 0.1 wt % to about 2.0 wt % of a total weight of catalytic system. In certain embodiments, platinum may be present up to about 2.0 wt % of a total weight of catalytic system. In certain embodiments, platinum may be present from about 0.4 wt % to about 5.0 wt %, from about 0.4 wt % to about 3.0 wt %, or from about 0.4 wt % to about 1.5 wt % of a total weight of catalytic material. In certain embodiments, palladium may be present up to about 5.0 wt %, up to about 3.0 wt %, or up to about 1.5 wt % of a total weight of catalytic material. In certain embodiments, platinum may be the only precious metal component in the catalytic material. In certain embodiments, the catalytic material may comprise a plurality of active precious metal components.

In certain embodiments of the disclosure, a portion of the catalytic material is in amorphous form. In certain aspects, at least 50%, at least 60%, at least 75% or at least 85% of the catalyst is in amorphous form. For instance, in one embodiment, the support may be at least 50%, at least 60%, at least 75%, at least 85%, or 100% amorphous.

The catalytic system of the present invention may be used independent of other materials to treat the generation turbine exhaust gas stream or can be combined with other materials. Similarly, the catalytic system of the present invention may be used independently to treat a volatile organic compound stream from a chemical plant or may be combined with other materials. In one embodiment, the catalytic system comprises a catalytic material washcoated onto a substrate. The substrate may be, e.g., a ceramic or a metal foil.

In certain embodiments, the sulfur-tolerant catalytic system of the present disclosure may include an acid additive. The acid additive may be an organic acid or any other suitable acid. For example, the acid additive may be selected from the group consisting of acetic acid or nitric acid, and a combination thereof.

The coating of the precious group metals on the support may be of any suitable thickness, e.g., from about 10 micrometers to about 150 micrometers.

In one embodiment, a cumulative pore volume of the sulfur-tolerant catalytic system is at least about 0.2 mL/g, from about 0.2 mL/g to about 1.2 mL/g, or about 0.7 mL/g. In other embodiments, an average pore radius of the sulfur-tolerant catalytic system is from about 1.5 nanometers to about 20 nanometers, from about 1.8 nanometers to about 7 nanometers, or about 2 nanometers, or about 7 nanometers.

In some embodiments, the sulfur tolerant catalytic system is directed to a physical mixture of active precious metal oxide catalyst particles and high surface area sulfur-tolerant support particles having separate domains of metal oxide and support and functioning independently as catalyst and aging protection respectively.

In other embodiments, the catalytic system comprises an alloy of active precious metal oxide catalysts and high surface area sulfur-tolerant support resulting in inseparable functionality for each material from the other.

In some embodiments, the catalytic system comprises a high surface area substrate particle in surface contact either within the pore structure and/or externally with small (<100 nm) domains of active precious metal oxides such that separate domains of metal oxide can function independently as catalyst and are provided protection from aging mechanisms within the substrate (e.g., by coating a substrate with a sulfur-tolerant support).

In other embodiments, a high surface area substrate particle is externally coated with a porous shell structure of a catalytic material such that the catalyst function is external to the sulfur-tolerant support providing a high catalytic surface area interior to the composite particle.

In other embodiments, a high surface area substrate encompasses an active precious metal oxide particle in a coating layer such that the metal oxide particle is entirely surrounded by a protective high surface area sulfur-tolerant support material.

In some embodiments, a material promoting oxygen storage may be added to the catalytic system such as, for example, bulk ceria. In some embodiments, other types of binders or oxygen storage materials may be used, such as silicon or zirconium based binders, e.g. colloidal silica, colloidal zirconia, zirconium nitrate or acetate solution, or combinations thereof, which may be present in a range of about 1%, about 2%, about 3%, about 4%, or about 5% to about 6%, about 7%, about 8%, about 9%, or about 10% by mass of the washcoat.

Method for Preparing a Sulfur-Tolerant Catalytic System

The present disclosure is also directed to methods of preparing a sulfur-tolerant catalytic system comprising coating a catalytic material onto a substrate, wherein the catalytic material comprises active precious metals, e.g., a mixture of platinum and palladium, and a sulfur-tolerant support, e.g., a mixture of silicon and zirconium oxides.

In other embodiments, a method of preparing a sulfur-tolerant catalytic system comprises coating a sulfur tolerant support onto a substrate, followed by impregnating active precious metals onto the coated substrate, wherein the active precious metals comprise, e.g., platinum, palladium, or a mixture thereof, and the sulfur-tolerant support comprises, e.g., a mixture of silica and zirconia.

In certain aspects, the coating may be done by, e.g., washcoating, spraying, powder coating, dip coating, or any equivalent method of coating. The catalytic system may further comprise other agents such as silicon, zirconium, or aluminum based binders, e.g. colloidal silica, colloidal zirconia, zirconium nitrate or acetate solution, or combinations thereof, which may be present in a range of about 1%, about 2%, about 3%, about 4%, or about 5% to about 6%, about 7%, about 8%, about 9%, or about 10% by mass based on the washcoat.

FIG. 1 is a flow chart illustrating a method 100 of preparing a sulfur-tolerant catalytic system according to an embodiment of the disclosure, the sulfur-tolerant catalytic material comprising a catalytic material (comprising an active precious metal component) and a sulfur-tolerant support material coated onto a substrate. In one embodiment, the catalytic material is prepared in accordance with block 102, for example, in the form of a slurry having target amounts of active precious metal salts (e.g., acetate, nitrate, carbonate, sulfate based salts, or potassium permanganate) mixed with a sulfur-tolerant support material (e.g., zirconia, silica, or combinations thereof). The active precious metals may be impregnated sequentially to incipient wetness on the sulfur-tolerant support material. Water may be added to target percent slurry solids. For example, the target percent slurry solids may be in the range of from about 20%, about 25%, about 30%, about 35% to about 40%, about 45%, or about 50%. The catalytic material may be in a form of particles and may be milled to obtain a desired particle size. The desired 90% cumulative undersize particle size may be, for example, from about 1, about 2, about 3, about 4, about 5, or about 6 to about 7, about 8, about 9, about 10, about 11, about 12, about 13, about 14, or about 15 micrometers. For instance, the 90% cumulative undersize particle size may be about 12 micrometers.

In certain embodiments, catalytic material prepared in block 102 may be coated onto a substrate in accordance with block 104. The substrate may comprise, for example, a monolithic catalyst substrate made of ceramic or metal. The substrate may comprise varying channel cross section shapes, for example, honeycomb, square, sinusoidal, triangular, hexagonal, trapezoidal, or round. The cell density of the substrate may range, for example, between about 64 to about 600 cells per square inch (cpsi). The wall thickness of the substrate may range from about 48 μm to about 380 μm.

The coated substrate is subsequently dried pursuant to block 106. The drying may be performed for a period ranging, for example, from about 1 minute, 5 minutes, 10 minutes, 15 minutes, 30 minutes, 1 hours, 2 hours, 3 hours, 4 hours, or 5 hours to about 8 hours, 10 hours, 13 hours, 16 hours, 24 hours, 48 hours, or 72 hours. The drying may be performed at a temperature ranging, for example, from about 105° C., about 150° C., about 200° C., or about 250° C. to about 300° C., about 400° C., about 500° C., about 550° C., or about 600° C., at a convection air dryer or a similar conventional drying method or apparatus. The coating according to block 104 and the drying according to block 106 may be repeated as many times as necessary to obtain a target loading concentration, for example, once, twice, or three times. The target loading concentration may range, from example, from about 10 g/l, about 15 g/l, about 20 g/l, or about 30 g/l to about 50 g/l, about 75 g/l, about 100 g/l, about 120 g/l, or about 150 g/l. In one embodiment, the target loading of the slurry onto the substrate may be about 100 g/l.

Any subsequent coating or drying may have the same conditions as those of the initial coating and drying, or may vary from the conditions of the initial coating and drying. For example, an initial slurry of catalytic material to be coated may contain about 40% slurry solids and a subsequent slurry of catalytic material to be coated may contain about 30% slurry solids, or both the initial and the subsequent slurry of catalytic material to be coated may contain the same percent slurry solids of about 35%. Another example may be where a substrate coated once is dried at 110° C. for about one hour, and the second coat is dried at 110° C. for about four hours, or where each of the coats are dried for the same time period at the same temperature.

The dried substrate may be subsequently calcined pursuant to block 108. The calcination may be performed in a muffle furnace or in a similar conventional calcination method or apparatus. Block 108 may follow a calcination cycle comprising, for example, ramping the temperature from about 110° C., about 150° C., about 200° C., or about 250° C. to about 300° C., about 400° C., about 500° C., about 550° C., or about 600° C. at a rate of about 1° C./min, about 2° C./min, about 3° C./min, about 3.7° C./min, or about 4° C./min, soaking at about 550° C. for about one, two, or three hours, and then cooling to about 110° C., about 150° C., about 200° C., or about 250° C. The temperatures, durations, and rates of the calcination in the above-referenced example should not be construed as limiting.

Figure 2:
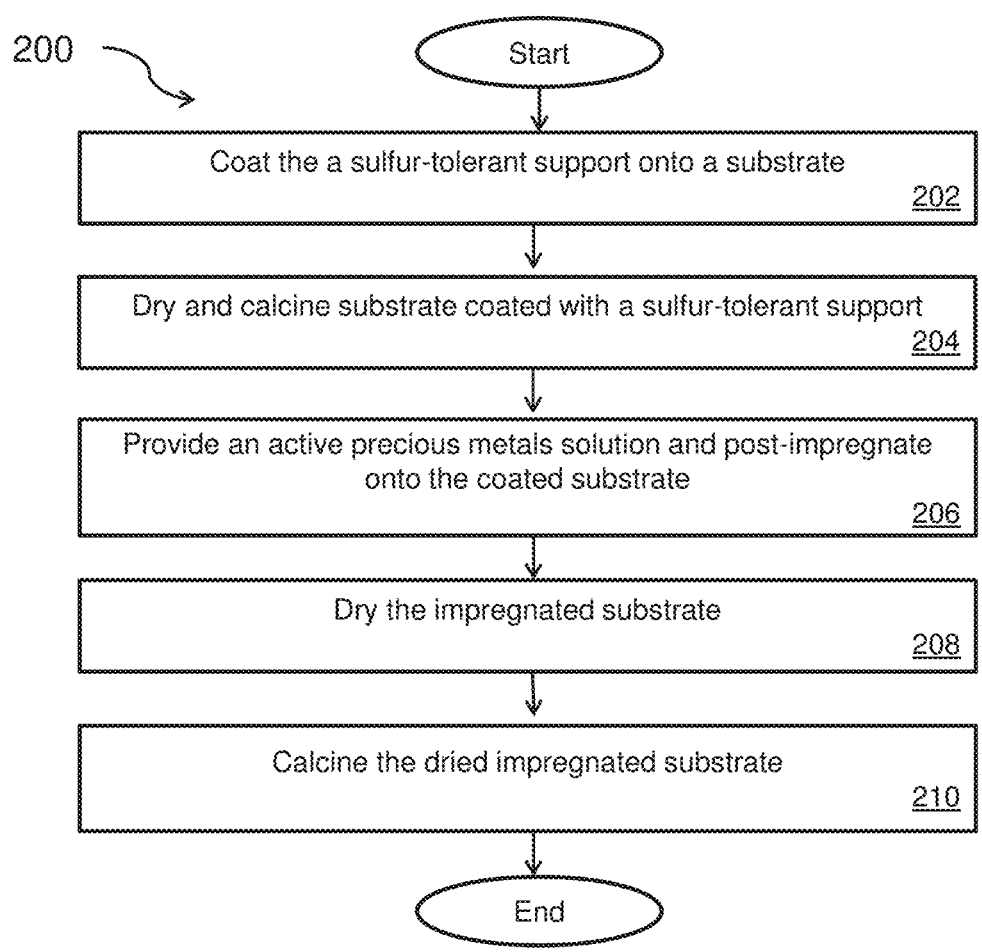
FIG. 2 is a flow chart illustrating a method for preparing a sulfur-tolerant catalytic system according to another embodiment of the disclosure.

FIG. 2 is a flow chart illustrating a method 200 for preparing a sulfur-tolerant catalytic system according to another embodiment of the disclosure, wherein a sulfur-tolerant support may be coated onto a substrate, the coated substrate is dried and calcined as necessary, followed by post impregnation of an active precious metal component onto the coated substrate, drying and calcining. In certain embodiments of method 200, a sulfur-tolerant support is coated onto a substrate in accordance with block 202. The substrate may comprise materials, shape, cell density, wall thickness, or pressure drop through it as described above in method 100.

The sulfur-tolerant support coating may be prepared in a form of slurry having target amounts of sulfur-tolerant support. The sulfur-tolerant support may be e.g., silica, zirconia, or mixtures thereof, wherein a mixture of silica and zirconia may comprise, for example, silica and zirconia mixed oxides, co-mingled silica and zirconia particles, co-precipitated silica and zirconia particles, silica particles coated with zirconia, zirconia particles coated with silica and other variations. The sulfur-tolerant support present in the slurry may range, for example, from about 80 wt %, about 85 wt %, about 90 wt %, or about 92 wt % to about 94 wt %, about 96 wt %, about 98 wt %, or about 99 wt % based on the total weight of the solids in the slurry.

In block 204, the coated substrate is dried and calcined as necessary before post-impregnation with an active precious metal component. In block 206, a solution having target levels of active precious metal salts (e.g., acetate, nitrate, carbonate, sulfate based salts, or potassium permangante) is mixed with the coated substrate. The active precious metal component may be e.g., platinum, palladium or a mixture thereof. The target level of platinum in the slurry may range, for example, from about 0.1 wt % to about 20 wt %, from about 1 wt % to about 10 wt %, from about 2 wt % to about 5 wt %, or about 3 wt % platinum based on the total weight of the solution. The target level of palladium in the slurry may range, for example, from about 0.1 wt % to about 20 wt %, from about 1 wt % to about 10 wt %, from about 2 wt % to about 5 wt %, or about 3 wt % palladium based on the total weight of the solution. The active precious metal component may be applied onto the coated substrate through the method of impregnation, washcoating and a similar equivalent method. Water may be added to target percent slurry solids. For example, the target percent slurry solids may be in the range from about 20%, about 25%, about 30%, about 35% to about 40%, about 45%, or about 50%. The slurry may comprise particles which may be milled to obtain a desired particle size. The desired 90% cumulative undersize particle size may be, for example, from about 1, about 2, about 3, about 4, about 5, or about 6 to about 7, about 8, about 9, about 10, about 11, about 12, about 13, about 14, or about 15 micrometers. For instance, the 90% cumulative undersize particle size may be about 10 or about 12 micrometers. Subsequently, in block 208, the coated substrate impregnated with an active precious metal component may be dried as described for drying block 106. Coating and drying according to blocks 206 and 208 may be repeated as necessary, either with varying conditions or as exact duplicates. The dried substrate may then be calcined in accordance with block 210 following a predetermined calcination cycle.

In certain embodiments, the catalytic material is a physical mixture of catalytic material particles and high surface area substrate particles, wherein the catalytic material particles are impregnated onto high surface area substrate particles. In other embodiments, the disclosure is directed to a physical mixture of active precious metal oxide particles and substrate particles, wherein the substrate particles are already coated with high surface area sulfur-tolerant support particles and the active precious metal oxide particles are post impregnated onto the coated substrate particles. The various particles may function independently as catalyst, aging protection, and sulfur tolerance.

In certain embodiments, the catalytic material is an alloy of active precious metal oxide and high surface area sulfur-tolerant support, wherein the active precious metal oxide is impregnated onto a high surface area sulfur-tolerant support. The function of the various materials is inseparable from each other.

In certain embodiments, the catalytic material is a high surface area support particle which is in surface contact either within the pore structure and/or externally with small (<100 nm) domains of active precious metal oxide catalysts such that separate domains of active precious metal oxides can function independently as catalysts and are provided protection from aging mechanisms within the support material.

Method for Controlling Carbon Monoxide Content

One aspect of the present disclosure is directed to a method of using a sulfur tolerant catalytic system in a stream containing high sulfur levels to oxidize pollutants such as carbon monoxide (CO), volatile organic compounds (e.g., aromatics, aldehydes, carboxylic acids, etc.), and $NO_x$ abatements into less harmful compounds such as oxygen, carbon dioxide and water vapor.

In another aspect, a sulfur-tolerant catalytic system comprises a catalytic material comprising an active precious metal component and a sulfur-tolerant support material impregnated with the active precious metal component, such that the catalytic material, when coated onto a substrate and contacted with a stream having an initial carbon monoxide concentration, converts carbon monoxide within the stream such that a final carbon monoxide concentration of the stream is reduced by greater than 70%, greater than 75%, greater than 80%, greater than 85%, greater than 90%, or greater than 95% of the initial carbon monoxide concentration after the sulfur-tolerant catalytic system is contacted with the airstream.

In another aspect, a sulfur-tolerant catalytic system comprises a sulfur-tolerant support material coated on a substrate and an active precious metal component impregnated on the coated substrate, such that the catalytic system, when contacted with a stream having an initial carbon monoxide concentration, converts carbon monoxide within the stream such that a final carbon monoxide concentration of the stream is reduced by greater than 70%, greater than 75%, greater than 80%, greater than 85%, greater than 90%, or greater than 95% of the initial carbon monoxide concentration after the catalytic system is contacted with the stream.

The initial carbon monoxide concentration ranges from about 5 ppm, about 10 ppm, about 25 ppm, about 50 ppm, or about 100 ppm to about 200 ppm, about 500 ppm, about 1000 ppm, about 1500 ppm, about 2000 ppm, about 2500 ppm, about 3000 ppm, about 3500 ppm, or about 4000 ppm. The space velocity of the stream may range from about 10,000 hr about 25,000 hr about 50,000 $hr^{-1}$, about 60,000 $hr^{-1}$, or about 100,000 $hr^{-1}$ to about 150,000 $hr^{-1}$, about 200,000 $hr^{-1}$, or about 300,000 $hr^{-1}$, and a temperature of the stream is maintained within a range of about 200° C., about 230° C., about 260° C., or about 300° C. to about 450° C., about 500° C., about 550° C., or about 600° C.

In one embodiment, the catalytic material, when coated onto a substrate and contacted with a stream having an initial carbon monoxide concentration, is adapted to convert carbon monoxide within the stream such that a final carbon monoxide concentration of the airstream is reduced by greater than 70%, greater than 75%, greater than 80%, greater than 85%, greater than 90%, or greater than 95% of the initial carbon monoxide concentration after the sulfur-tolerant catalytic system is contacted with the stream. In some embodiments, the final carbon monoxide concentration of the stream is reduced by greater than 60% of the initial carbon monoxide concentration.

In one embodiment, the catalytic performance of a sulfur-tolerant catalytic system according to the disclosure remains acceptable and consistent after continuous operation for at least 1500 hours. In one embodiment, the catalytic performance of a sulfur-tolerant catalytic system according to the disclosure remains acceptable and consistent after continuous operation for at least 3300 hours. In one embodiment, the catalytic performance of a sulfur-tolerant catalytic system according to the disclosure remains acceptable and consistent after continuous operation for at least 5000 hours.

The following examples are set forth to assist in understanding the invention and should not, of course, be construed as specifically limiting the invention described and claimed herein. Such variations of the invention, including the substitution of all equivalents now known or later developed, which would be within the purview of those skilled in the art, and changes in formulation or minor changes in experimental design, are to be considered to fall within the scope of the invention incorporated herein.

ILLUSTRATIVE EXAMPLES

Example 1: Sulfur-Tolerant Catalytic System Preparation

Platinum A (16.62% Pt) and Palladium nitrate salt solutions (20.24% Pd) were impregnated sequentially to incipient wetness on a silica-zirconia support material. Water was then added to the impregnated powder to target 45% slurry solids. The slurry was then passed through an EMI horizontal continuous mill until the d90 cumulative undersize particle size was 10 μm. Bulk ceria was added and the slurry was mixed under low shear mixing until homogenized. A ceramic honeycomb core was coated with the slurry mixture at a slurry solids content of approximately 27%. The coated honeycomb was dried at 110° C. for one hour in a convection air dryer prior to recoating a second time to target loading of 105 g/l total washcoat. The honeycomb was then dried again at 110° C. for four hours. The dried honeycomb was transferred to a muffle furnace at 110° C. for the following calcination cycle: ramp from 110° C. to 550° C. at 3.7° C./min, then soak at 550° C. for two hours, then cool to 110° C. for dry weight. The target washcoat concentration was as follows:
Pt, as metal: 0.5%
Pd, as metal: 0.5%
10% silica on zirconia: 98.0%
Ceria: 1.0%

Example 2: Sulfur-Tolerant Catalytic System Preparation (Containing Aluminum)

Zirconyl nitrate solution and boehmite aluminum oxide hydroxide were added to water. A 10% silica on zirconia support material was added to target 40% slurry solids. The slurry was then passed through an EMI horizontal continuous mill until the d90 cumulative undersize particle size was 10 μm. Bulk ceria was added and the slurry was mixed under low shear mixing until homogenized. Zirconyl acetate solution was added to the slurry and a Fe—Cr—Al corrugated foil was coated with the slurry mixture at a slurry solids content of approximately 30%. The coated foil was dried at 110° C. for one hour in a convection air dryer prior to recoating a second time. Again the coated foil was dried at 110° C. for one hour in a convection air dryer prior to recoating a third time to a target loading of 28 mg/int. The dried foil was transferred to a muffle furnace at 110° C. for the following calcination cycle: ramp from 110° C. to 550° C. at 3.7° C./min, then soak at 550° C. for two hours, then cool to 110° C. for dry weight. The target washcoat concentration was as follows:
10% silica on zirconia: 86.6%
Zirconia (as nitrate and acetate): 7.4%
Alumina (as boehmite aluminum oxide hydroxide): 5.0%
Ceria: 1.0%

Tetraamine platinum hydroxide solution was diluted with deionized water and then sprayed onto to the calcined washcoat on the foil until the washcoat was completely saturated. The target platinum loading was 1.0 wt %. The wet foil was dried at 110° C. for one hour. The dried foil was transferred to a muffle furnace at 110° C. for the following calcination cycle: ramp from 110° C. to 550° C. at 3.7° C./min, then soak at 550° C. for two hours, then cool to 110° C. for dry weight.

TABLE 1

Catalytic System Morphological Properties

| Sample | Active precious metal dispersion (XPS) | Surface Area (BET), m²/g | Pore volume (BJH), mL/g | Avg. Pore Radius (BJH), nm |
|---|---|---|---|---|
| Example 1 | Pt: 0.48<br>Pd: 0.48 | 210 | 0.7 | 6 |
| Example 2 (with Aluminum) | Pt: 0.5 | 195 | 0.5 | 6 |

Example 3: Carbon Monoxide Conversion Testing Method

Figure 3:
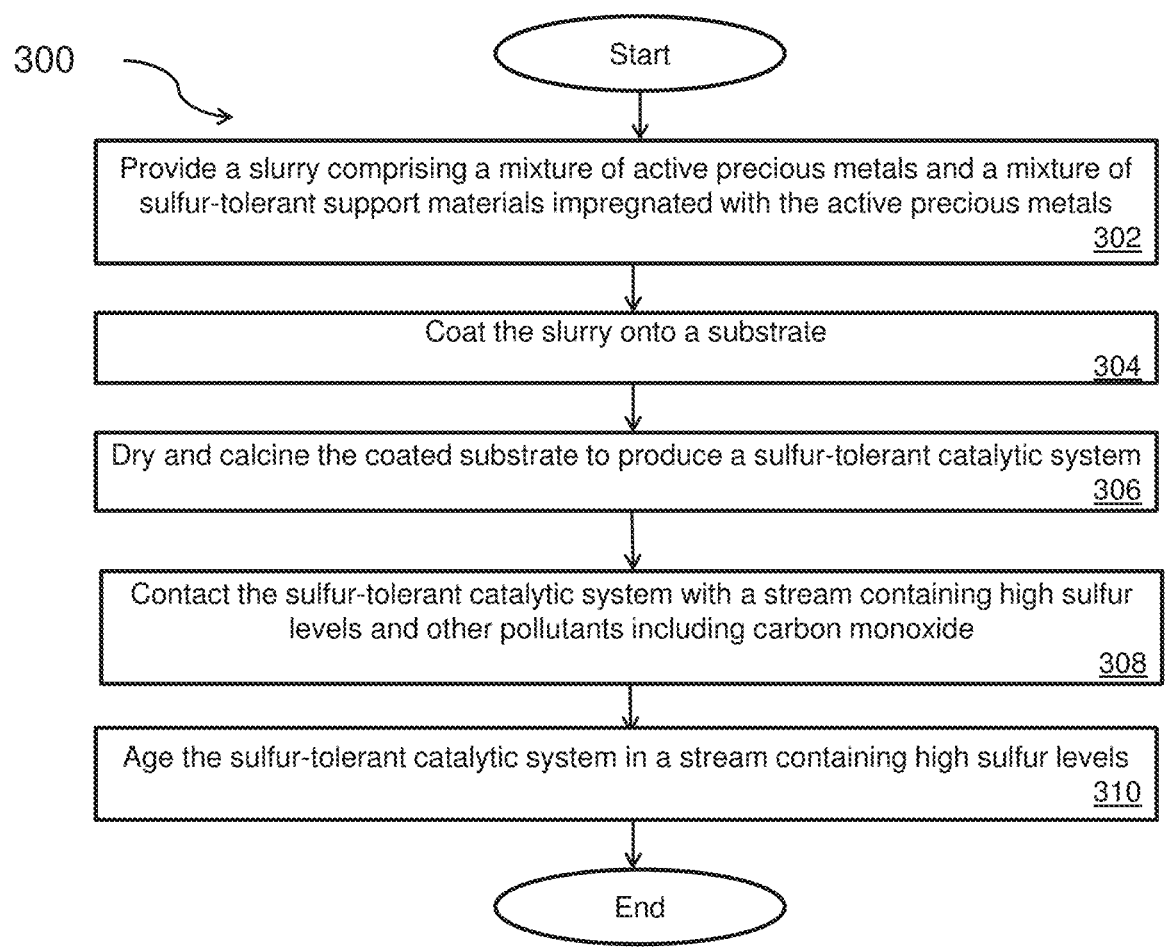
FIG. 3 is a flow chart illustrating a method for controlling carbon monoxide levels in a stream containing high sulfur levels.
Figure 4:
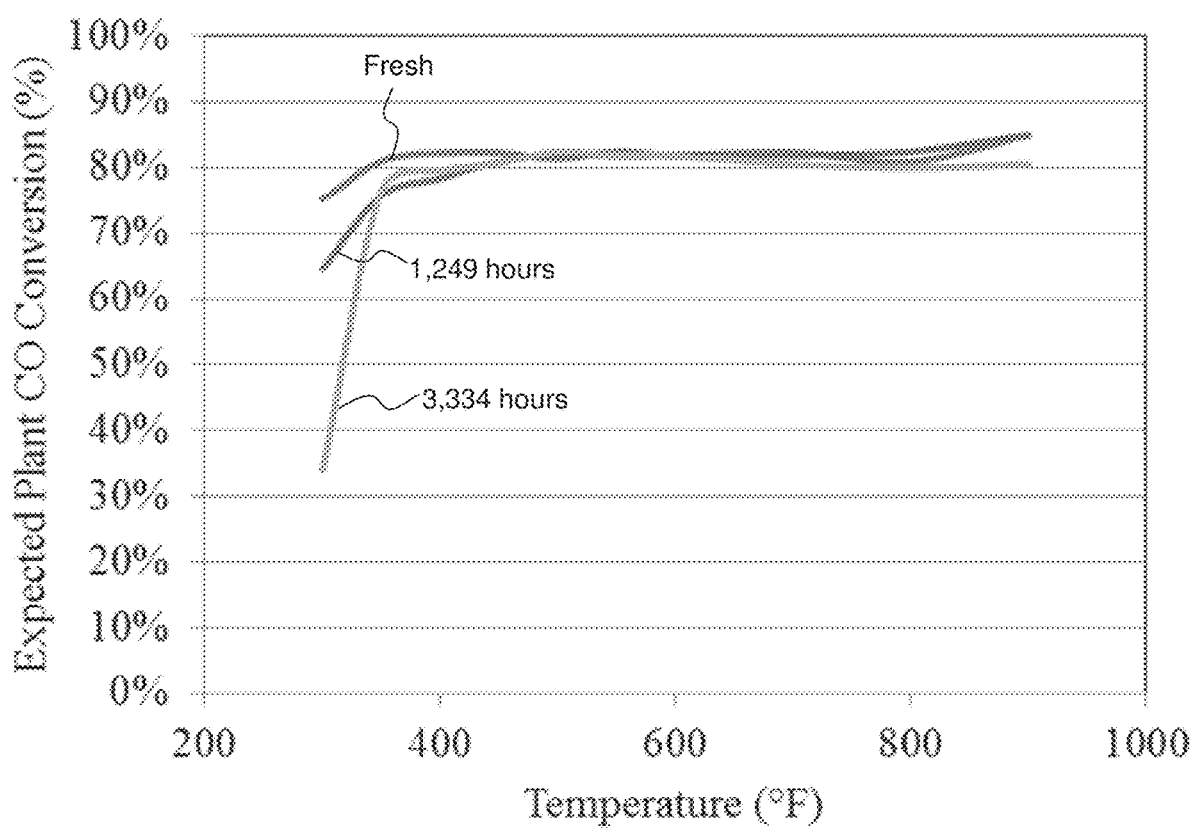
FIG. 4 is a plot showing sustained long term catalyst performance of one embodiment of the present disclosure in a stream containing high sulfur levels.

FIG. 3 is a flow chart illustrating a method for controlling carbon monoxide levels in a stream containing high sulfur levels (e.g., using a catalyst prepared according to Example 1 and corresponding to blocks 302-306). In block 308, the resulting sulfur-tolerant catalytic system is contacted with a stream containing carbon monoxide, high sulfur levels, and other pollutants in order to oxidize the pollutants into less harmful compounds. The sulfur-tolerant catalytic system is operated in a stream containing high level of sulfur continuously for at least about four and a half months, in accordance with block 310. The resulting performance of a catalytic system, according to an embodiment of the disclosure, over the extended period of time of four and a half months is shown in FIG. 4. According to FIG. 4, the carbon monoxide conversion remains about 80% or greater regardless of whether the sulfur-tolerant catalyst used is fresh, has been operating for 1,249 hours (about 52 days) or for 3,334 hours (about 139 days).

XPS measurements were conducted using a K-Alpha™+ x-ray photoelectron spectrometer system (Thermo Scientific) with an aluminium K-α X-ray source. Powder samples were loaded onto carbon tape and outgassed for 2 hours prior to analysis. After an initial survey scan of the sample surface from 0-1350 eV, targeted high resolution scans of identified elements were conducted using a constant pass energy of 40.0 eV. The binding energies were referenced to the adventitious C1s peak, 284.8 eV. Shirley background and mixed Gaussian-Lorentzian line shapes were used to fit the resulting XPS spectra. Relative atomic percentages were then determined using the fitted peak data and sensitivity factors of each element (provided by Avantage software).

The pore structure of the supported catalyst, including both the pore volume and pore width, as well as surface area of the catalysis compositions were measured using a Micromeritics® TriStar 3000 Series instrument. Samples were prepared using an initial degassing cycle under $N_2$ with a 2 hour ramp rate up to 300° C. and a 4 hour soak time at 300° C. For surface area values, a 5 point BET measurement was used with partial pressures of 0.08, 0.11, 0.14, 0.17, and 0.20. Cumulative pore volume and average pore radius measurements were obtained from a BJH multipoint $N_2$ desorption/adsorption isotherm analysis using only pores with radii between 1.0 nm and 30.0 nm.

Example 4: Raman Spectra Analysis of Support

Figure 5:
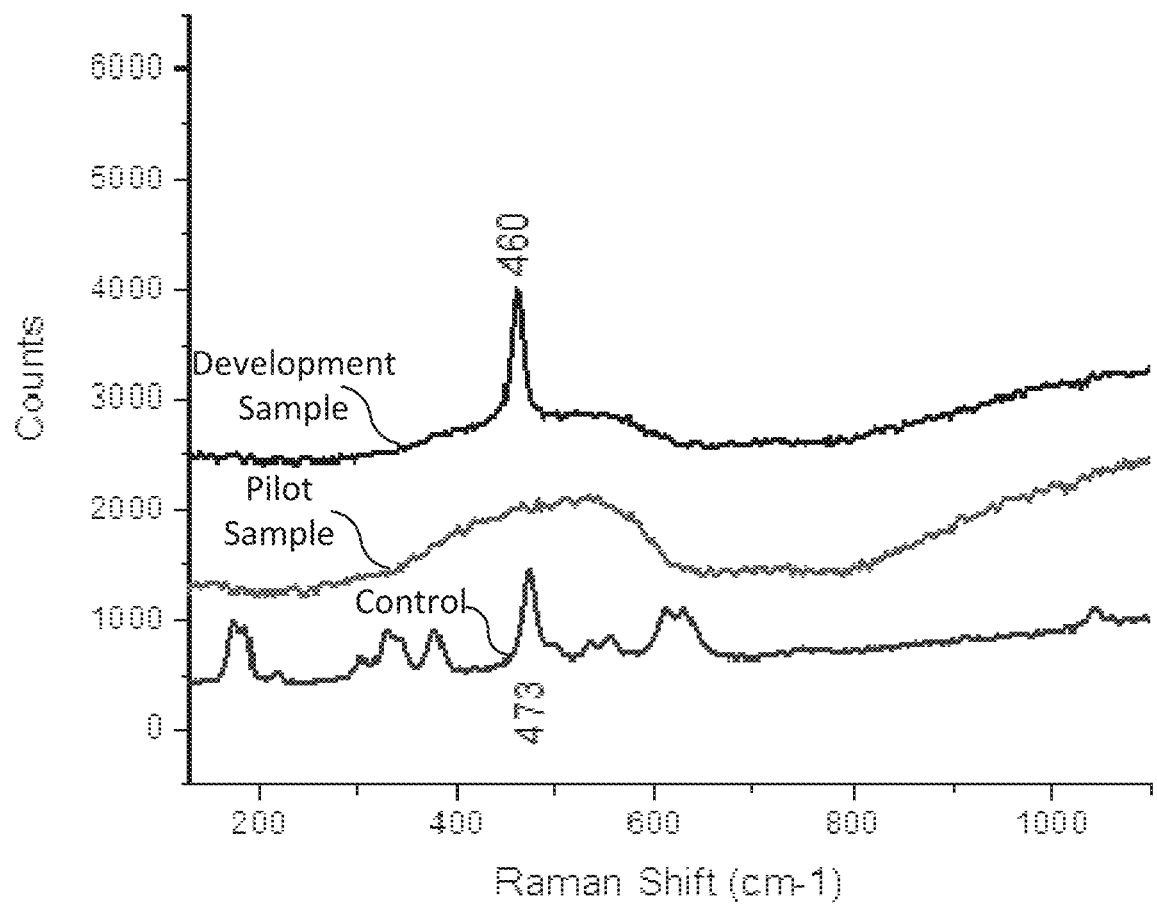
FIG. 5 is a Raman spectra of the support utilized in sulfur-tolerant catalytic systems according to embodiments of the disclosure.

Three samples were analyzed using Raman Spectra, namely a pure zirconia sample, a 10% silica on zirconia sample obtained during development, and a 10% silica on zirconia sample obtained in the pilot phase. The results are summarized in FIG. 5.

Raman spectra were collected on a Reneshaw InVia Raman microscope with 488 nm laser as the excitation source. A Leica N PLAN microscope/50× objective lens was used to focus the 488 nm laser beam on the sample surface at 100% in power usage. Raman spectra were collected under ambient condition.

The control sample (pure zirconia) showed a monoclinic crystal system phase. The two 10% silica on zirconia samples did not show crystalline structures as compared to the control. However, the 10% silica on zirconia sample obtained during development showed a sharp peak at 460 $cm^{-1}$, which is very close to 473 $cm^{-1}$ peak in the reference sample. This peak may be due to distorted O—O vibration in zirconia by silica. This assumption should not be construed as limiting.

For simplicity of explanation, the embodiments of the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

In the foregoing description, numerous specific details are set forth, such as specific materials, dimensions, processes parameters, etc., to provide a thorough understanding of the present invention. The particular features, structures, materials, or characteristics may be combined in any suitable manner in one or more embodiments. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Reference throughout this specification to "an embodiment", "certain embodiments", or "one embodiment" means that a particular feature, structure, or characteristic described in connection with the embodiment is included in at least one embodiment. Thus, the appearances of the phrase "an embodiment", "certain embodiments", or "one embodiment" in various places throughout this specification are not necessarily all referring to the same embodiment.

The term "about", when referring to a physical quantity, is to be understood to include measurement errors within, and inclusive of 2%. For example, "about 100° C." should be understood to mean "100±1° C.".

The present invention has been described with reference to specific exemplary embodiments thereof. The specification and drawings are, accordingly, to be regarded in an illustrative rather than a restrictive sense. Various modifications of the invention in addition to those shown and described herein will become apparent to those skilled in the art and are intended to fall within the scope of the appended claims.

What is claimed is:

1. A catalytic material comprising:
an active precious metal component comprising platinum;
a sulfur-tolerant support material comprising silica on zirconia; and
a substrate having the catalytic material coated thereon, wherein the silica to zirconia ratio in the sulfur-tolerant support material ranges from 1:4 to 1:98.

2. The catalytic material of claim 1, wherein the platinum is present in an amount from 0.4 wt % to 5.0 wt % of a total weight of the catalytic material.

3. The catalytic material of claim 1, wherein the active precious metal component further comprises palladium, wherein the palladium is present in an amount of from about 0.1 wt % and up to 5.0 wt % of a total weight of the catalytic material.

4. The catalytic material of claim 1, wherein the sulfur-tolerant support material is present in an amount from 90 wt % to 98 wt % of a total weight of the catalytic material.

5. The catalytic material of claim 1, further comprising bulk ceria.

6. The catalytic material of claim 5, wherein the bulk ceria is present in an amount from 0.5 wt % to 10 wt % of a total weight of the catalytic material.

7. The catalytic material of claim 1, wherein the substrate comprises a ceramic material or a metal.

8. The catalytic material of claim 1, further comprising a binder comprising one or more of silicon, zirconium, or aluminum.

9. The catalytic material of claim 8, wherein the binder is present in an amount of from about 1 wt % and up to 10 wt % of a total weight of the catalytic material.

10. The catalytic material of claim 1, wherein the catalytic material is in a form of particles, and wherein 90% of the particles of the catalytic material have a particle size ranging from about 6 micrometers to about 14 micrometers.

11. The catalytic material of claim 10, wherein 90% of the particles of the catalytic material have a particle size of about 10 micrometers.

12. A catalytic system comprising the catalytic material of claim 1.

13. A catalytic system comprising a catalytic material, the catalytic material comprising:
an active precious metal component comprising a mixture of platinum and palladium; and a substrate having a sulfur-tolerant support material coated on the substrate, wherein the sulfur-tolerant support material comprises a mixture of silica and zirconia, and wherein the silica to zirconia ratio in the sulfur-tolerant support material ranges from 1:4 to 1:98.

14. The catalytic system of claim 13, wherein the platinum is present in an amount from 0.4 wt % to 5.0 wt % of a total weight of the catalytic material.

15. The catalytic system of claim 13, wherein the palladium is present in an amount of from about 0.1 wt % and up to 5.0 wt % of a total weight of the catalytic material.

16. The catalytic system of claim 13, wherein the sulfur-tolerant support material is present in an amount from 90 wt % to 98 wt % of a total weight of the catalytic material.

17. The catalytic system of claim 13, further comprising bulk ceria.

18. The catalytic material of claim 17, wherein the bulk ceria is present in an amount from 0.5 wt % to 10 wt % of a total weight of the catalytic material.

19. The catalytic system of claim 13, wherein the substrate comprises a ceramic material or a metal.

20. The catalytic system of claim 13, further comprising a silicon, zirconium, or aluminum based binder.

* * * * *